(12) United States Patent
Okuyama

(10) Patent No.: US 6,246,526 B1
(45) Date of Patent: Jun. 12, 2001

(54) LIGHT IRRADIATING APPARATUS AND IMAGE DISPLAYING APPARATUS

(75) Inventor: Atsushi Okuyama, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,210

(22) Filed: Nov. 29, 1999

(30) Foreign Application Priority Data

Nov. 30, 1998 (JP) .................................................. 10-340655

(51) Int. Cl.$^7$ .................................................. G02B 27/10
(52) U.S. Cl. .......................... 359/621; 359/619; 359/622; 359/627; 359/487; 359/640; 353/31; 355/53; 349/5; 362/268
(58) Field of Search .................................... 359/621, 622, 359/627, 629, 640, 487, 494, 495, 619; 353/31, 38, 102; 355/53, 67; 349/5, 9; 362/268

(56) References Cited

U.S. PATENT DOCUMENTS

| | | | |
|---|---|---|---|
| 5,253,110 | * | 10/1993 | Ichihara et al. ...................... 359/619 |
| 5,900,985 | * | 5/1999 | Ho et al. ............................... 359/640 |
| 5,978,136 | * | 11/1999 | Ogawa et al. ........................ 359/487 |
| 6,075,648 | * | 6/2000 | Yamamoto et al. .................. 359/619 |
| 6,084,714 | * | 7/2000 | Ushiyama et al. ................... 359/627 |
| 6,120,153 | * | 9/2000 | Ohta ...................................... 353/31 |

\* cited by examiner

*Primary Examiner*—Loha Ben
(74) *Attorney, Agent, or Firm*—Morgan & Finnegan LLP

(57) ABSTRACT

In a light irradiating apparatus, a first fly-eye lens and a second fly-eye lens are disposed in succession from a light source side. A first lens having negative refractive power is disposed more adjacent to the light source side than the first fly-eye lens. A second lens having positive refractive power is disposed more adjacent to the light source side than the second fly-eye lens. The specification also discloses an image projecting apparatus for illuminating an image display element by the light emerging from the light irradiating apparatus, and projecting an image displayed on the image display element.

35 Claims, 8 Drawing Sheets

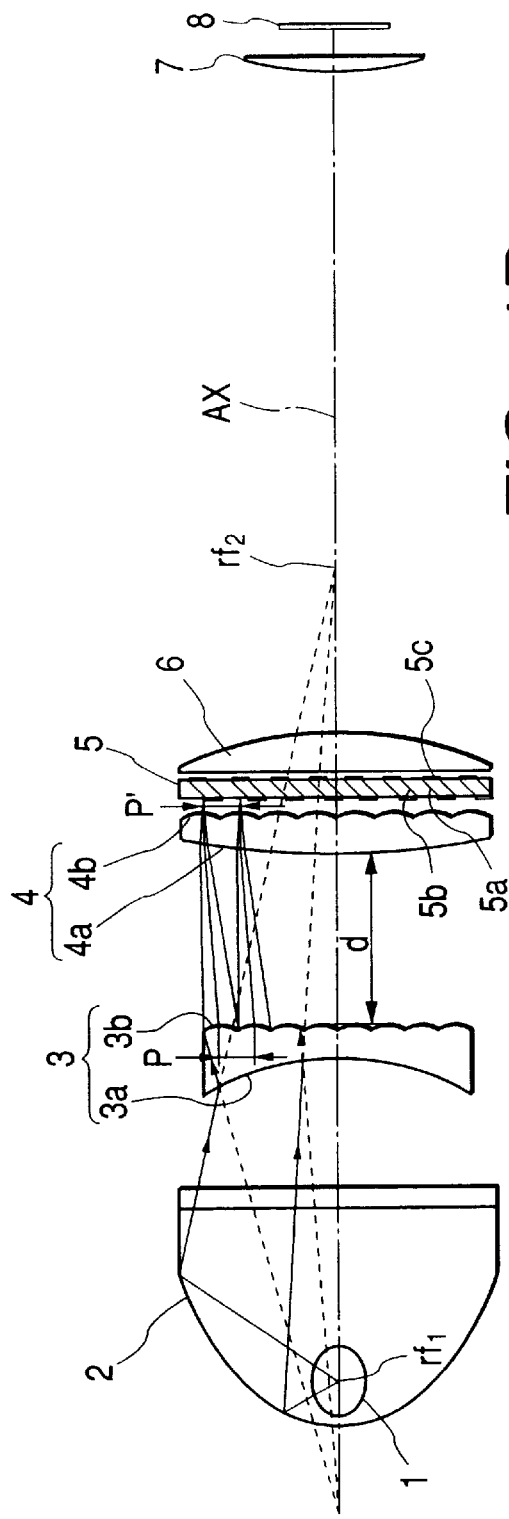
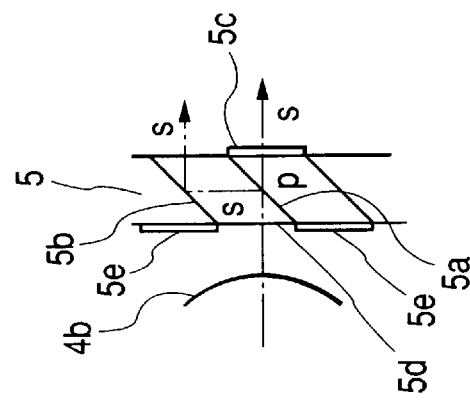

LIGHT IRRADIATING APPARATUS AND IMAGE DISPLAYING APPARATUS

BACKGROUND OF THE INVENTION

1. Field of the Invention

This invention relates to a light irradiating apparatus for use when an image display element is to be uniformly illuminated, and more particularly to an image displaying apparatus such as a liquid crystal projector using such light irradiating apparatus in an illuminating system.

2. Related Background Art

In a liquid crystal projector for enlarging and projecting an image displayed on a liquid crystal display element, use has heretofore been made of an illuminating system for condensing a light emitted from a white light source in a particular direction by a reflecting mirror, and uniformly illuminating the liquid crystal image display element by a fly-eye lens integrator. In this illuminating system, as proposed in Japanese Laid-Open Patent Application No. 8-304739, etc., use is made of a polarization converting element for aligning the direction of polarization of the illuminating light in accordance with the polarization characteristic of the liquid crystal display element.

FIG. 12 of the accompanying drawings shows the illuminating system (polarization converting system) proposed by the above-mentioned publication. As shown in this figure, when two fly-eye lens 101 and 102 and a polarization converting element 103 are to be combined together, the separation of polarization is such that non-polarized illuminating light is separated into P-polarized component and S-polarized component at the condensing position of the first fly-eye lens 101 formed near the second fly-eye lens 102. That is, only the light transmitted through the area Fa of a half of the pitch of each lens constituting the second fly-eye lens 102 is polarization-converted.

In the construction as shown in FIG. 12, however, there is the problem that when the parallelism of the illuminating light incident on the first fly-eye lens 101 is bad (the illuminating angle α is great), the condensed spot (point image) by the first fly-eye lens 101 becomes large and therefore, the light protrudes out of the range of the area Fa and the percentage of the quantity of light which can be used for polarization conversion is reduced. When use is made of a construction as proposed, for example, in Japanese Laid-Open Patent Application No. 10-133198 wherein an elliptical mirror and a concave lens are combined and illuminating light is compressed into a narrower area, action similar to that of a teleconverter comprising positive and negative lenses is provided by the positive power of the elliptical shape and the negative power of the concave lens, and in contrast with a construction for collecting light by a parabolic mirror, conversion is effected so that the parallelism of the illuminating light emerging from the concave lens may be aggravated (the illuminating angle may increase). Therefore, even if the polarization converting element proposed in Japanese Laid-Open Patent Application No. 8-304739 is used in it, the rate of the light transmitted through the area Fa of a half of the lens pitch of the second fly-eye lens is reduced and thus, a desired increase in the quantity of light cannot be expected.

Also, even when as proposed in Japanese Laid-Open Patent Application No. 10-133141, an elliptical mirror and a concave lens are combined and a polarization converting element is provided between fly-eye lenses, an area for aligning the direction of polarization (an area through which the light of P-polarized component is transmitted and an area through which the light of S-polarized component is transmitted) is provided near the second fly-eye lens correspondingly to the area of a half of the lens pitch of the second fly-eye lens and therefore likewise, a reduction in the percentage of the polarization-converted light occurs.

SUMMARY OF THE INVENTION

The present invention has been made in view of the above-noted problems.

According to a first aspect of the invention of the application, in a light irradiating apparatus for applying light from a light source to an object to be irradiated through a polarizing element array comprising a plurality of polarizing elements arranged, a divergent light is applied to a fly-eye lens (lens array), whereby a plurality of light source images having an arrangement period greater than the arrangement period of the lenses of the fly-eye lens are formed by the fly-eye lens, and light beams forming the plurality of light source images are directed to the polarizing element array of which the arrangement period of the polarizing elements is greater than the arrangement period of the lenses of the fly-eye lens.

Also, according to a second aspect of the invention of the application, in a light irradiating apparatus for applying light from a light source to an object to be irradiated through a polarizing element array comprising a plurality of polarizing elements arranged, a divergent light is applied to a first fly-eye lens, whereby a plurality of light source images having an arrangement period greater than the arrangement period of the lenses of the first fly-eye lens are formed by the first fly-eye lens, and light beams forming the plurality of light source images are directed to the polarizing element array of which the arrangement period of the polarizing elements is greater than the arrangement period of the lenses of the first fly-eye lens through a second fly-eye lens of which the arrangement period of the lenses is greater than the arrangement period of the lenses of the first fly-eye lens.

Also, according to a third aspect of the invention of the application, in a light apparatus for applying light from a light source to an object to be irradiated through a polarizing element array comprising a plurality of polarizing elements arranged, divergent light is applied to a first fly-eye lens, whereby a plurality of light source images of which the arrangement period is greater than the arrangement period of the lenses of the first fly-eye lens are formed by the first fly-eye lens, and light beams forming the plurality of light source images are converted into parallel lights, for example, by a collimator lens, and thereafter is directed to the polarizing element array of which the arrangement period of the polarizing elements is greater than the arrangement period of the lenses of the first fly-eye lens.

In the third aspect of the invention, provision may be made of a second fly-eye lens for receiving the light from the polarizing element array and of which the arrangement period of the lenses is greater than the arrangement period of the lenses of the first fly-eye lens.

Also, according to a fourth aspect of the invention of the application, in a light irradiating apparatus for applying light from a light source to an object to be irradiated through a polarizing element array comprising a plurality of polarizing elements arranged, a divergent light is applied to a first fly-eye lens, whereby a plurality of light source images of which the arrangement period is greater than the arrangement period of the lenses of the first fly-eye lens are formed by the first fly-eye lens, and after or before light beams forming the plurality of light source images are converted into parallel lights, for example, by a collimator lens, the light beams are directed to the polarizing element array of which the arrangement period of the polarizing elements is greater than the arrangement period of the lenses of the first fly-eye lens through a second fly-eye lens of which the arrangement period of the lenses is greater than the arrangement period of the lenses of the first fly-eye lens.

In the first to fourth aspects of the invention, at least one of polarization separating film and a half wavelength plate may be provided on each polarizing element.

According to a fifth aspect of the invention of the application, there are disposed, in succession from a light source side, a first fly-eye lens and a second fly-eye lens, and a first lens having negative refractive power is disposed between to the light source and the first fly-eye lens, and a second lens having positive refractive power and for making a light beam emerging, for example, from each lens constituting the first fly-eye lens and passing through the vertex of each lens constituting the second fly-eye lens parallel to a predetermined reference optical axis is disposed between the first fly-eye lens and the second fly-eye lens.

Also, according to a sixth aspect of the invention of the application, there are disposed, in succession from a light source side, a first fly-eye lens and a second fly-eye lens, and a first lens having negative refractive power is disposed between the light source and the first fly-eye lens, and each lens constituting the second fly-eye lens is given positive refractive power for making a light beam emerging from each lens constituting the first fly-eye lens and passing through the vertex of said each lens parallel to a predetermined reference optical axis.

According to such a construction, first by the action of the first lens having negative refractive power, rays of light passing through the vertexes of individual lenses constituting the first fly-eye lens (the principal rays of the individual lenses) are set so as to diverge relative to any reference optical axis (e.g. the optical axis of a reflecting mirror). Therefore, the illuminating light is condensed near the second fly-eye lens by the first fly-eye lens, the pitch of respective condensing points becomes greater than the lens pitch of the first fly-eye lens. Accordingly, when for example, the area of a half of the lens pitch of the second fly-eye lens array is made into an opening portion and use is made of a polarization converting element having a plurality of minute polarization separating portions for separating a light beam incident from the opening portion into P-component and S-component and provided with a phase plate on the emergence surface thereof and converting one or both of the directions of polarization to thereby uniformize the directions of polarization, the loss of light incident on this polarization converting element during the incidence thereof can be reduced.

Also, by the action of the second lens having positive refractive power provided between the first fly-eye lens and the second fly-eye lens or the action of the second fly-eye lens given positive refractive power as by making each lens constituting the lens array eccentric, a ray of light emerging from the first fly-eye lens in the diverging direction and passing through the vertex of each lens constituting the second lens array (the principal rays of individual lenses) becomes substantially parallel (telecentric) to a reference optical axis (e.g. the optical axis of a reflecting mirror). Thereby, the light beam can be set so as to be incident on each polarization separating portion of the polarization converting element at 45° so that the loss of the quantity of light by the incidence angle characteristic of the polarization separating film can be eliminated.

In the fifth aspect of the invention, the first lens having negative refractive power, the first fly-eye lens, the second lens having positive refractive power, the second fly-eye lens and a polarization converting element may be disposed in succession from the light source side. In this case, it is desirable that the pitch of the lenses constituting the second fly-eye lens be made greater than the pitch of the lenses constituting the first fly-eye lens or the pitch of the polarization separating portions of the polarization converting element be made greater than the pitch of the lenses constituting the first fly-eye lens.

Also, in the fifth aspect of the invention, the first lens having negative refractive power, the first fly-eye lens, the polarization converting element, the second lens having positive refractive power and the second fly-eye lens may be disposed in succession from the light source side. In this case, it is desirable that the pitch of the lenses constituting the second fly-eye lens be made greater than the pitch of the lens constituting the first fly-eye lens.

Also, in the fifth aspect of the invention, the first lens having negative refractive power, the first fly-eye lens, the second lens having positive refractive power, the polarization converting element and the second fly-eye lens may be disposed in succession from the light source side. In this case, it is desirable that the pitch of the polarization separating portions of the polarization converting element be made greater than the pitch of the lenses constituting the first fly-eye lens.

In the above-described inventions, the first lens and the first fly-eye lens or the second lens and the second fly-eye lens may be constructed discretely from each other or may be integrally molded so as to be adjacent to each other. However, when the first lens and the first fly-eye lens are constructed discretely from each other, the illuminating apparatus can be made more compact if the refractive index of the first lens is made high (desirably 1.7 or higher) so that the radius of curvature of the negative lens may become great.

Also, the condensing point at which the light is condensed by the action of the first fly-eye lens is provided near the second fly-eye lens, whereby the eclipse of the light on the polarization converting element is decreased. Further, the focal point position of the second fly-eye lens on the first fly-eye lens side is provided near the first fly-eye lens, whereby the convergent light beam by the first fly-eye lens can be efficiently superposed on the image display element.

To satisfy such condition in the present invention, it is necessary to make the focal lengths of the individual lenses of the second fly-eye lens shorter than the focal lengths of the individual lenses of the first fly-eye lens.

BRIEF DESCRIPTION OF THE DRAWINGS

FIG. 1A shows the construction of a light irradiating apparatus which is a first embodiment of the present invention, and FIG. 1B is a cross-sectional view parallel to the optical axis of the polarization converting element thereof.

DESCRIPTION OF THE PREFERRED EMBODIMENTS

FIRST EMBODIMENT

Figure 2:
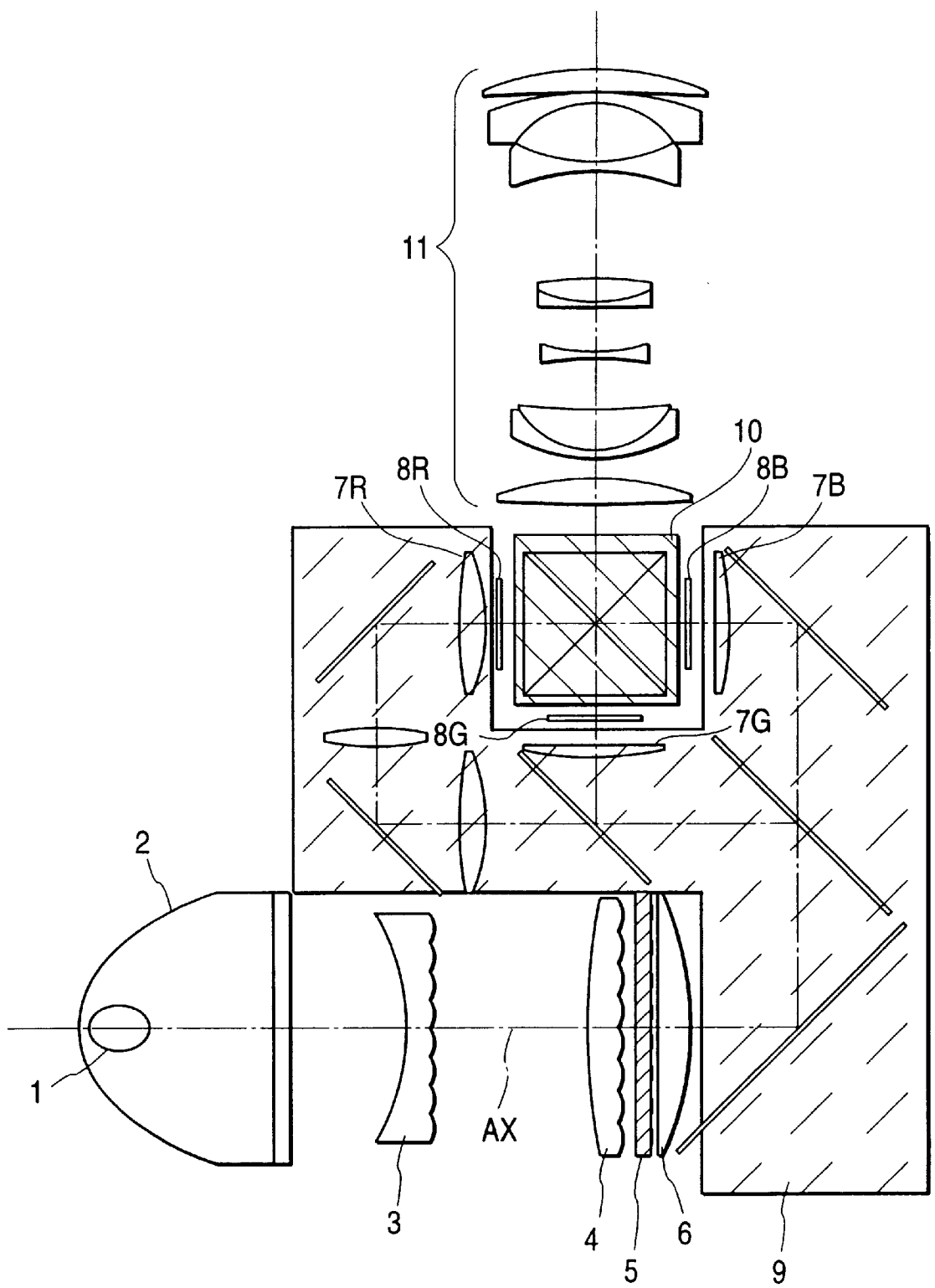
FIG. 2 is a layout view of a liquid crystal projector incorporating the light irradiating apparatus of FIG. 1 therein.

FIG. 1A shows a light irradiating apparatus (illuminating system) which is a first embodiment of the present invention. Rreference numeral 1 designates a white light source, and reference numeral 2 denotes an elliptically shaped reflector (reflecting member).

In the order from the white light source 1 side, reference numeral 3 designates a first lens array integrally molded so as to have a concavely shaped first lens portion 3a facing the light source 1 side, and a first fly-eye lens portion 3b comprised of a combination of a plurality of lenses facing the side opposite to the light source 1 side.

Reference numeral 4 denotes a second lens array integrally molded so as to have a convexly shaped second lens portion 4a facing the light source 1 (first lens array 3) side, and a second fly-eye lens portion 4b comprised of a combination of a plurality of lenses facing the side opposite to the light source 1 (first lens array 3) side.

Reference numeral 5 designates a polarization converting element, reference character 5a denotes polarization separating film, reference character 5b designates a reflecting surface, and reference character 5c denotes a half wavelength plate. Reference numeral 6 designates a condensing lens, reference numeral 7 denotes a condenser lens, and reference numeral 8 designates a liquid crystal image display element provided in an image projecting apparatus.

In FIG. 1A, the optical path from the light source 1 to the liquid crystal image display element 8 is shown as being straight, but when they are actually incorporated in the image projecting apparatus, a color separating system 9 comprising a dichroic mirror or the like is disposed between the condensing lens 6 and the condenser lenses 7R, 7G, 7B, as shown in FIG. 2. White light from the light source 1 is separated three color lights R, G and B by the color separating system 9, and these color lights are transmitted through liquid crystal image display elements 8R, 8G and 8B for displaying R, G and B images, respectively. They are combined into an optical path by a color combining system 10 comprising dichroic mirrors or the like, and by a projection lens 11, R, G and B images are combined and enlarged and projected onto a screen, not shown. This image projecting apparatus is a so-called three-panels type full color liquid crystal projector.

The optical action of the light irradiating apparatus according to the first embodiment will now be described with reference to FIGS. 1A and 1B. The white light source 1 is disposed at the location of the first focal point rf1 of the reflector 2. Light emitted from the white light source 1 is reflected toward the second focal point rf2 of the reflector 2 by a cold mirror forming the reflecting surface of the reflector 2, is incident as a convergent light beam on the concave surface of the first lens portion 3a of the first lens array 3, and is converted into a divergent light beam by the action of the first lens portion 3a. Further, it is divided into a plurality of convergent light beams divergent as a whole by the first fly-eye lens portion 3b, and is condensed so as to form a plurality of condensing points at a pitch (P') wider than the pitch (P) of the lenses of the first fly-eye lens portion 3b (P'>P).

A plurality of convergent light beams from the first lens array 3 are incident on the convex surface of the second lens portion 4a of the second lens array 4 disposed with a wide interval P' relative to the first fly-eye lens portion 3b, and the central rays of the plurality of light beams from the first lens array 3 are all refracted by this convex surface so as to become substantially parallel (telecentric) to the optical axis (reference optical axis AX) of the reflector 2 and pass through the second fly-eye lens portion 4b.

The first fly-eye lens portion 3b has the function of an imaging lens, whereas the second fly-eye lens portion 4b serves as a field lens, and has the action of making the convergent light beams at various angles formed by the lenses of the first fly-eye lens portion 3b parallel (telecentric) to the reference optical axis AX. The positions of the condensing points of the plurality of light beams by the first fly-eye lens portion 3b may be before or behind the second fly-eye lens portion 4b if near it.

Each light beam transmitted through the second fly-eye lens portion 4b enters an opening portion 5d corresponding to one of the plurality of polarization separating films 5a of the polarization converting element 5. By the polarization separating film 5a, the light beam is separated into a transmitted light component (P-polarized component) and a reflected light component (S-polarized component). The light of the S-polarized component is reflected in a direction parallel to the optical axis AX by the reflecting mirror 5b and emerges from the element, and the light of the P-polarized component has its direction of polarization converted into the same direction as that of the S-polarized component by the half wavelength plate 5c provided on the emergence surface of the element and emerges. Thus, all the unpolarized lights having emerged from the second lens array 4 are converted into S-polarized lights by the polarization converting element 5. Reference character 5e designates a light intercepting portion.

The plurality of S-polarized light beams having emerged from the polarization converting element 5 are superinposed one upon another on the liquid crystal image display element 8 by a relay optical system comprising the condensing lens 6 and the condenser lens 7 and uniformly illuminated the liquid crystal image display element 8.

When as described above, the light from the light source 1 is condensed by the elliptical mirror 2 and the concave lens 3a, generally the parallelism of the light beam to the first fly-eye lens portion 3b becomes bad and particularly, the loss of the light beam passing through the central portion of the first fly-eye lens portion 3b in the opening portions of the polarization converting element tends to increase. In contrast, in the present embodiment, the magnitude of the negative refractive power of the first lens portion 3a is set so that the condensing points may be formed at a pitch greater than the lens pitch of the first fly-eye lens portion 3b, whereby each opening portion of the polarization converting element 5 corresponding to each condensing point can be made large and thus, the loss of light in each opening portion can be reduced.

The characteristic of the polarization separating film 5a is changed by the angle of incidence of the light beam and therefore, to reduce the loss of light in the polarization separating film 5a, it is desirable that the light beam incident on the polarization separating film 5a be made into a parallel light beam. Therefore, the second fly-eye lens portion 4b is necessary more adjacent to the light source side than the polarization separating element 5, and the second lens portion 4a having a convex surface becomes necessary more adjacent to the light source side than this fly-eye lens portion 4b.

Figure 3:
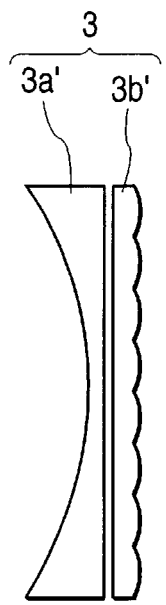
FIG. 3 is an illustration showing an example of the construction of a lens array used in the light irradiating apparatus of FIG. 1.
Figure 4:
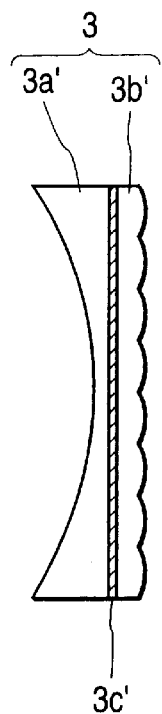
FIG. 4 is an illustration showing an example of the construction of the lens array used in the light irradiating apparatus of FIG. 1.

While the present embodiment has been described with respect to a case where in the first lens array 3, the concavely shaped first lens portion 3a and the fly-eye lens portion 3b are molded integrally with each other, there may be adopted a construction as shown in FIG. 3 wherein a plano-concave lens 3a' having negative refractive power and a fly-eye lens 3b' of which one surface is flat are disposed adjacent to each other, or a construction as shown in FIG. 4 wherein a plano-concave lens 3a' having negative refractive power and a fly-eye lens 3b' of which one surface is flat are joined together by an adhesive agent 3c'.

Figure 5:
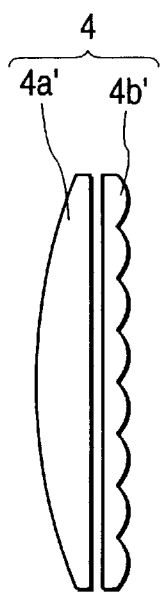
FIG. 5 is an illustration showing an example of the construction of the lens array used in the light irradiating apparatus of FIG. 1.
Figure 6:
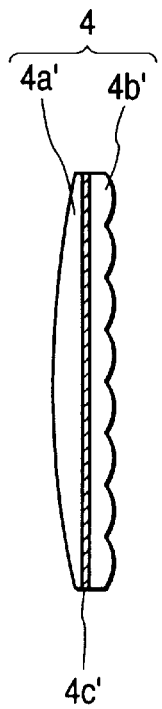
FIG. 6 is an illustration showing an example of the construction of the lens array used in the light irradiating apparatus of FIG. 1.
Figure 7:
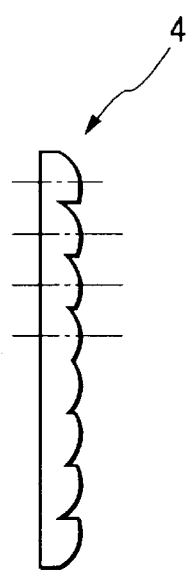
FIG. 7 is an illustration showing an example of the construction of the lens array used in the light irradiating apparatus of FIG. 1.

Also, the second lens array may be of a construction as shown in FIG. 5 wherein a plano-convex lens 4a' having positive refractive power and a fly-eye lens 4b' of which one surface is flat are disposed adjacent to each other, or a construction as shown in FIG. 6 wherein a plano-convex lens 4a' having positive refractive power and a fly-eye lens 4b' of which one surface is flat are joined together by an adhesive agent 4c'. Further, the second lens array may be of a construction as shown in FIG. 7 wherein individual lenses constituting a fly-eye lens are made eccentric and are given action equal to that when combined with a convexly shaped positive lens.

Figure 8:
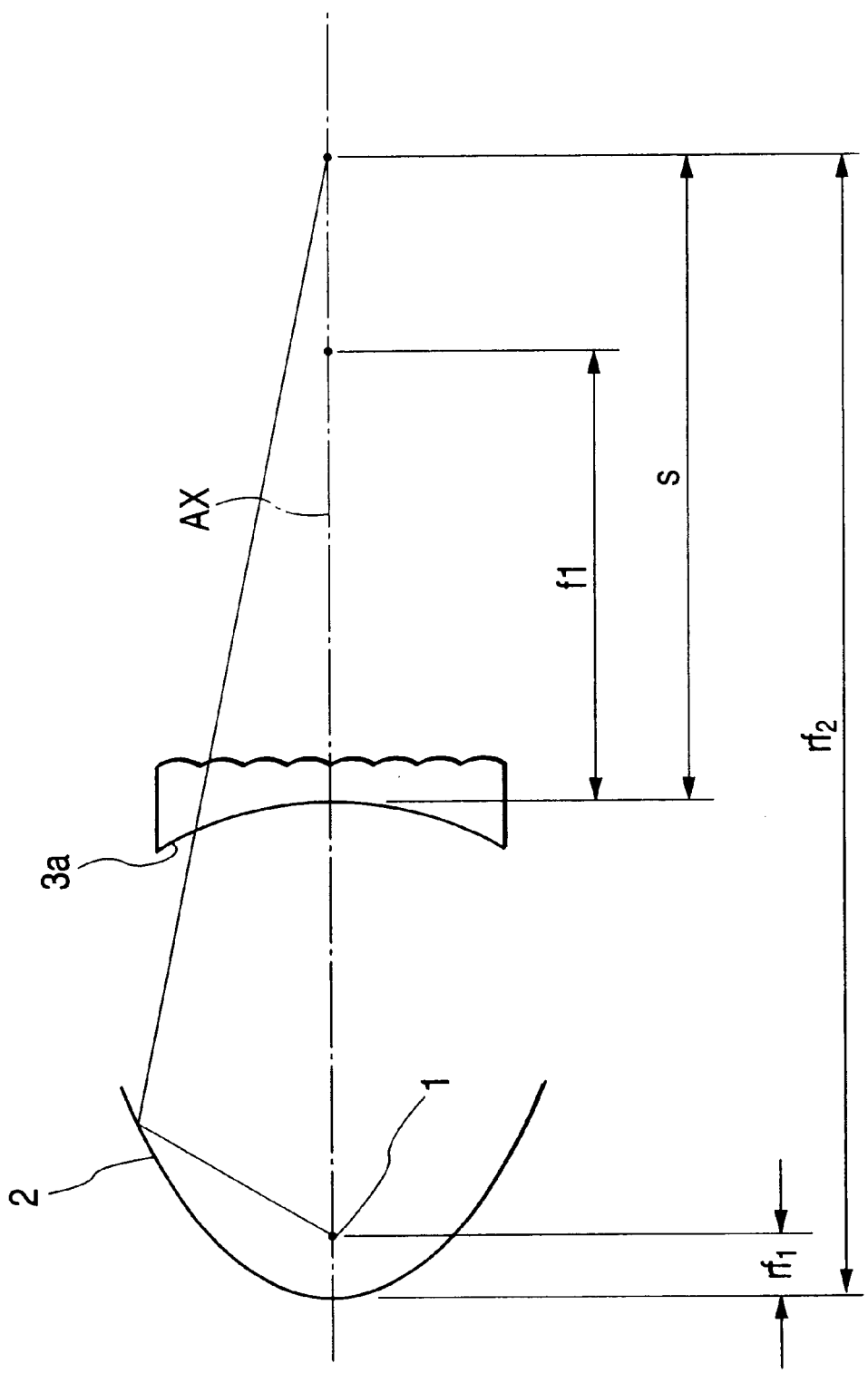
FIG. 8 is an illustration of the optical relation in the light irradiating apparatus of FIG. 1.

An optical system according to embodiment 1 will now be described in detail with reference to FIG. 8. The position of the first focal point of an elliptically shaped reflector 2 is defined as rf1, and the position of the second focal point thereof is defined as rf2. When at this time, the distance from the first lens portion 3a of a first lens array 3 having a concave shape to the second focus rf2 of the reflector 2 is defined as s and the focal length of the first lens portion 3a is defined as f1, the shape is determined so that |f1|<|s|, whereby by a first fly-eye lens portion 3b, a plurality of condensing points can be made at a pitch greater than the arrangement pitch of a plurality of lenses constituting the first fly-eye lens portion 3b.

Also, as in the present Embodiment 1, the shape of the reflector 2 for condensing the light from the light source 1 is made into an elliptical shape, whereby the light beam from the light source 1 is condensed within a narrow range by the first lens array 3, whereafter it is condensed near a second lens array 4 by the first lens array 3 and therefore, it is not necessary to make the second lens array 4 larger than before, and a compact light irradiating apparatus (illuminating system) can be realized. If such a construction is adopted, the angle of illuminating light with respect to a liquid crystal image display element 8 can be kept small. Therefore, there can be realized an illuminating system suitable for a case where a liquid crystal image display element with a microlens array designed to improve the utilization efficiency of light by providing a condensing lens for each pixel and reducing the loss of light by the light intercepting portion between pixels.

SECOND EMBODIMENT

Figure 9:
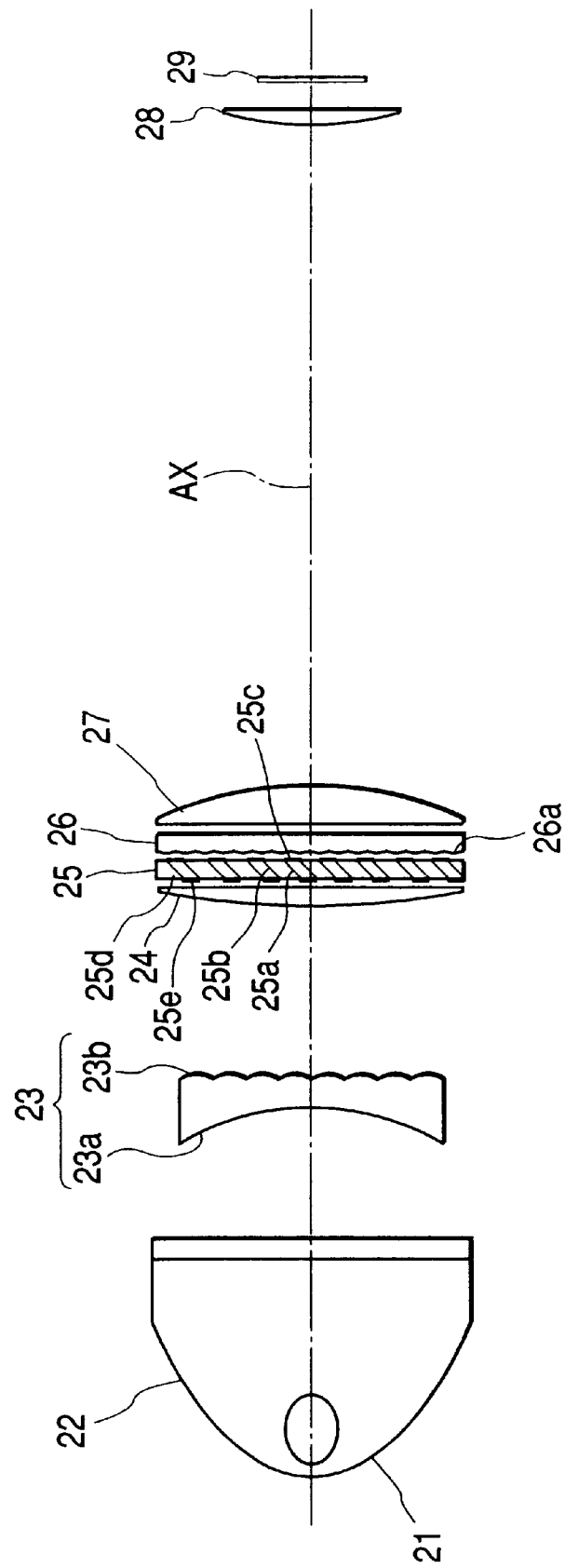
FIG. 9 shows the construction of a light irradiating apparatus which is a second embodiment of the present invention.

FIG. 9 shows a light irradiating apparatus (illuminating system) which is a second embodiment of the present invention. Reference numeral 21 designates a white light source, and reference numeral 22 denotes an elliptically shaped reflector.

In the order from the light source 21 side, reference numeral 23 designates a first lens array integrally molded so as to have a concavely shaped first lens portion 23a facing the light source side, and a first fly-eye lens portion 23b formed by a combination of a plurality of lenses facing the side opposite to the light source side.

Reference numeral 24 denotes a positive lens (second lens). Reference numeral 25 designates a polarization converting element, reference character 25a denotes polarization separating film, reference character 25b denotes a reflecting surface, reference character 25c designates a half wavelength plate, reference character 25d denotes an opening portion, and reference character 25e designates a light intercepting portion.

Reference numeral 26 denotes a second fly-eye lens formed by a combination of a plurality of lenses 26a facing the light source side (the polarization converting element 25 side). Reference numeral 27 designates a condensing lens, reference numeral 28 denotes a condenser lens, and reference numeral 29 designates a liquid crystal image display element provided in an image projecting apparatus.

The white light source 21 is disposed at the location of the first focal point of the reflector 22.

Light emitted from the white light source 21 is reflected toward the second focal point of the reflector 22 by a cold mirror provided on the mirror surface of the reflector 22, is incident as convergent light on the concave surface of the first lens portion 23a of the first lens array 23, is converted into divergent light by this concave surface, and is further divided into a plurality of convergent light beams by the first fly-eye lens portion 23b, and the plurality of convergent light beams are condensed at a pitch wider than the pitch of the lenses of the first fly-eye lens portion 23b.

The plurality of convergent light beams from the first lens array 23 are incident on the positive lens 24, and the central ray of each convergent light beam is refracted so as to become substantially parallel (telecentric) to the optical axis (reference optical axis AX) of the reflector 22. Each light beam enters an opening portion corresponding to one of the plurality of polarization separating films 25a of the polarization converting element 25, and is separated into the light of a transmitted P-polarized component and the light of a reflected S-polarized component by the polarization separating film 25a. The light of the S-polarized component is reflected in a direction parallel to the optical axis AX by the reflecting mirror 25b and emerges from the element 25, and the light of the P-polarized component has its direction of polarization converted into the same direction as that of the S-polarized component by the half wavelength plate 25c provided on the emergence surface of the element and emerges. Thus all the plurality of convergent light beams incident on the polarization converting element 25 are converted into S-polarized lights.

The number of the plurality of light beams emerging from the polarization converting element 25 becomes double the number of the light beams divided and formed by the first lens array 23, and are transmitted through the second fly-eye lens 26 formed by lenses double in number those of the first fly-eye lens portion 23b. The second fly-eye lens 26 serves as a field lens for the imaged light beams by the first fly-eye lens portion 23b, and has the action of making the convergent light beams of various angles formed by the lenses of the first fly-eye lens portion 23b parallel (telecentric) to the optical axis AX. The position of the condensing point of the first fly-eye lens portion 23b may preferably be set between the polarization converting element 25 and the second fly-eye lens 26.

The lights transmitted through the second fly-eye lens 26 are superposed one upon another on the liquid crystal image display element 29 by a relay optical system comprising the condensing lens 27 and the condenser lens 28, and uniformly illuminate the liquid crystal image display element 29. The specific constructions of the optical systems forward and rearward of the element 29 are as shown in FIG. 2.

While the present Embodiment 2 has been described with respect to a case where in the first lens array 23, the concavely shaped first lens portion 23a and the first fly-eye lens portion 23b are molded integrally with each other, it may be of a construction in which a plano-concave lens having negative refractive power and a fly-eye lens of which one surface is flat are disposed adjacent to each other, or a construction in which a plano-concave lens having negative refractive power and a fly-eye lens of which one surface is flat have their flat surfaces jointed together by an adhesive agent.

THIRD EMBODIMENT

Figure 10:
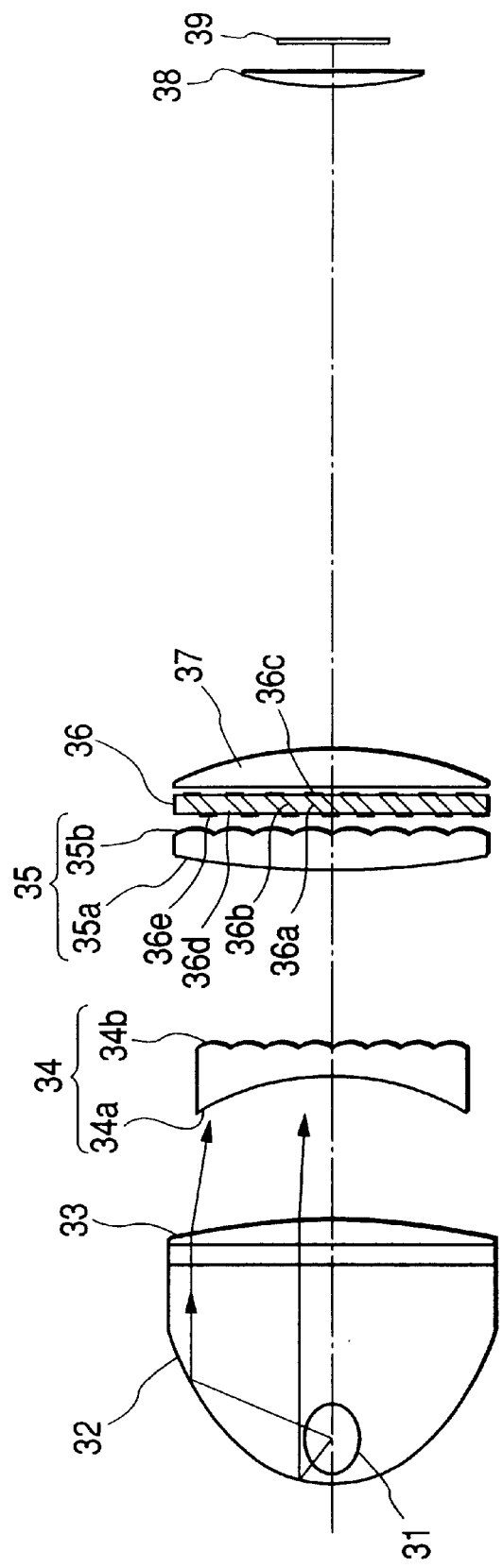
FIG. 10 shows the construction of a light irradiating apparatus which is a third embodiment of the present invention.

FIG. 10 shows a light irradiating apparatus (illuminating system) which is a third embodiment of the present invention. Reference numeral 31 designates a white light source, and reference numeral 32 denotes a parabolically shaped reflector.

In the order from the light source 31 side, reference numeral 33 designates a positive lens. Reference numeral 34 denotes a first lens array integrally molded so as to have a concavely shaped first lens portion 34a facing the light source side, and a first fly-eye lens portion 34b formed by a combination of a plurality of lenses facing the side opposite to the light source side.

Reference numeral 35 designates a second lens array integrally molded so as to have a convexly shaped second lens portion 35a facing the light source 31 (first lens array 34) side, and a second fly-eye lens portion 35b formed by a combination of a plurality of lenses facing the side opposite to the light source 31 side.

Reference numeral 36 denotes a polarization converting element, reference character 36a designates polarization separating film, reference character 36b denotes a reflecting surface, reference character 36c designates a half wavelength plate, reference character 36d denotes an opening portion, and reference character 36e designates a light intercepting portion. Reference numeral 37 denotes a condensing lens, reference numeral 38 designates a condenser lens, and reference numeral 39 denotes a liquid crystal image display element provided in an image projecting apparatus.

The only difference between the present Embodiment 3 and the first embodiment is that the action of the elliptically shaped reflector 2 in the first embodiment is provided by the parabolically shaped reflector 32 and the positive lens 33, and in the other points, the optical action of the present embodiment is the same as that of the first embodiment described in connection with FIGS. 1 to 8.

The action of condensing the light from the light source 31 is thus shared by the parabolically shaped reflector 32 and the positive lens 33, whereby even when for example, the size of the liquid crystal image display element differs and thereby the construction of the illuminating system differs, a light source unit comprising the light source 31 and the reflector 32 is made common and the refractive power of the positive lens 33 is suitably adjusted, whereby it becomes possible to realize the constructons of the illuminating systems of various specifications. Thereby, it becomes unnecessary to make an entirely discrete light source unit for each illuminating system and it becomes possible to reduce the manufacturing cost.

While the present Embodiment 3 has been described with respect to a case where in the first lens array 34, the concavely shaped first lens portion 34a and the fly-eye lens portion 34b are molded integrally with each other, it may be of a construction in which a plano-concave lens having negative refractive power and a fly-eye lens of which one surface is flat are disposed adjacent to each other, or a construction in which a plano-concave lens having negative refractive power and a fly-eye lens of which one surface is flat have their flat surfaces joined together by an adhesive agent.

Also, the second lens array 35 may be of a construction in which a plano-convex lens having positive refractive power and a fly-eye lens of which one surface is flat are disposed adjacent to each other, or a construction in which a plano-convex lens having positive refractive power and a fly-eye lens of which one surface is flat have their flat surfaces joined together by an adhesive agent. Further, it may be of a construction in which individual lenses constituting the fly-eye lens are made eccentric and are given action equal to that when combined with a convexly shaped positive lens.

FOURTH EMBODIMENT

Figure 11:
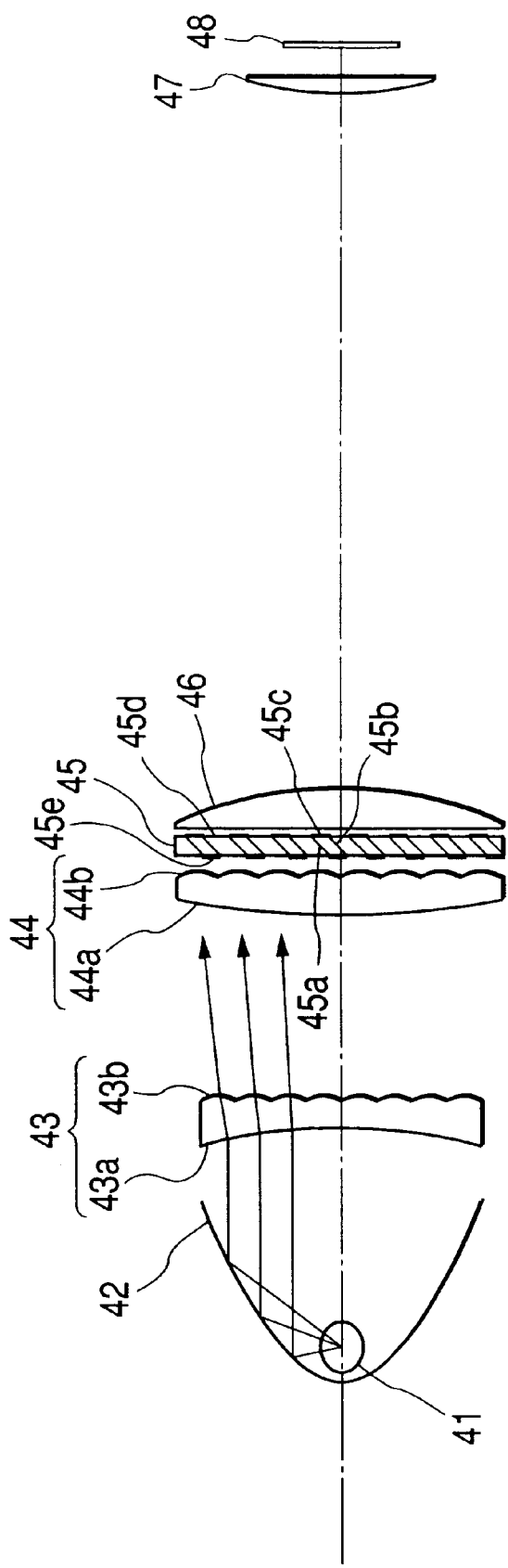
FIG. 11 shows the construction of a light irradiating apparatus which is a fourth embodiment of the present invention.
Figure 12:
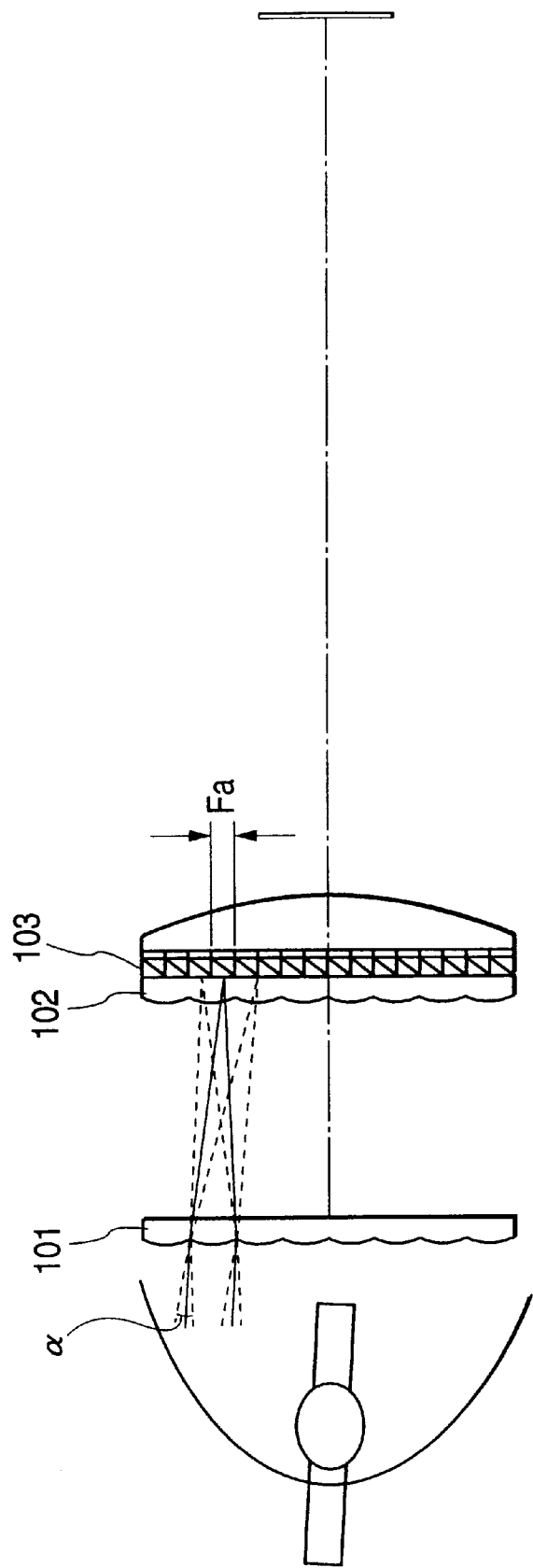
FIG. 12 shows the construction of a light irradiating apparatus according to the prior art.

FIG. 11 shows a light irradiating apparatus (illuminating system) which is a fourth embodiment of the present invention. Reference numeral 41 designates a white light source, and reference numeral 42 denotes a parabolically shaped reflector.

In the order from the light source 41 side, reference numeral 43 designates a first lens array integrally molded so as to have a concavely shaped first lens portion 43a facing the light source side, and a first fly-eye lens portion 43b formed by a combination of a plurality of lenses facing the side opposite to the light source side.

Reference numeral 44 denotes a second lens array integrally molded so as to have a convexly shaped second lens portion 44a facing the light source (first lens array 43) side, and a second fly-eye lens portion 44b formed by a combination of a plurality of lenses facing the side opposite to the light source side.

Reference numeral 45 designates a polarization converting element, reference character 45a denotes polarization separating film, reference character 45b designates a reflecting surface, reference character 45c denotes a half wavelength plate, reference character 45d designates an opening portion, and reference character 45e denotes a light intercepting portion. Reference numeral 46 designates a condensing lens, reference numeral 47 denotes a condenser lens, and reference numeral 48 designates a liquid crystal image display element provided in an image projecting apparatus.

In the present Embodiment 4, light from the light source 41 is condensed as a substantially parallel light beam by the reflector 42, and it is converted into a divergent light by the concavely shaped first lens portion 43a of the first lens array 43, and is further divided into a plurality of convergent lights by the first fly-eye lens portion 43b, and the plurality of convergent lights are condensed at a pitch wider than the pitch of the lenses of the first fly-eye lens portion 43b to thereby realize an effect similar to that of the first embodiment.

To more efficiently condense the light emitted from the light source 41, it is desirable to make the reflector 42 large, while on the other hand, the illuminating system becomes bulky. Particularly when an attempt is made to make the apparatus compact by the use of a liquid crystal image display element having a small image display area, it is desirable to use a parabolically shaped reflector advantageous for downsizing. Again in such case, a concavely shaped or concave lens element having the diverging action is provided in the first lens array 43, whereby it becomes possible to set the pitch of the condensing points by the first fly-eye lens portion 43b more widely than the pitch of the lenses of the first fly-eye lens portion 43b, and a similar effect can be obtained.

While the present Embodiment 4 has been described with respect to a case where in the first lens array 43, the concavely shaped first lens portion 43a and the fly-eye lens portion 43b are molded integrally with each other, it may be of a construction in which a plano-concave lens having negative refractive power and a fly-eye lens of which one surface is flat are disposed adjacent to each other, or a construction in which a plano-concave lens having negative refractive power and a fly-eye lens of which one surface is flat have their flat surfaces jointed together by an adhesive agent.

Also, the second lens array 44 may be of a construction in which a plano-convex lens having positive refractive power and a fly-eye lens of which one surface is flat are disposed adjacent to each other, or a construction in which a plano-convex lens having positive refractive power and a fly-eye lens of which one surface is flat have their flat surfaces joined together by an adhesive agent. Further, it may be of a construction in which individual lenses constituting the fly-eye lens are made eccentric and are given action equal to that when combined with a convexly shaped positive lens.

Further, while each of the foregoing embodiments have been described with respect to a case where a white light source is used as a light source, it is also possible to use other light sources. Also, a three-panels type full color liquid crystal projector has been mentioned as an object of the application of the present invention, but the present invention can also be applied to a single-plate type monochromatic or full color liquid crystal projector.

Also, while each of the foregoing embodiments has been described as being used as the illuminating system of a liquid crystal image display element, the light irradiating apparatus of the present invention can also be used for other uses in which it is necessary to uniformly illuminate an object.

What is claimed is:

1. A light irradiating apparatus characterized in that a first fly-eye lens and a second fly-eye lens are disposed in succession from a light source side, a first lens having negative refractive power is disposed between said light source and said first fly-eye lens, and a second lens having positive refractive power is disposed between said first and second fly-eye lenses.

2. A light irradiating apparatus according to claim 1, characterized in that said second lens has positive refractive power which makes a ray of light emerging from each lens constituting said first fly-eye lens and passing through the vertex of each lens constituting said second fly-eye lens parallel to an optical axis.

3. A light irradiating apparatus for emitting a light beam from a light source through a polarization converting element having a plurality of polarization separating portions, characterized in that a first fly-eye lens and a second fly-eye lens are disposed in succession from the light source side, a first lens having negative refractive power is disposed more adjacent to the light source side than said first fly-eye lens, and a second lens having positive refractive power is disposed more adjacent to the light source side than said second fly-eye lens.

4. A light irradiating apparatus according to claim 3, characterized in that said second lens has positive refractive power which makes a ray of light emerging from each lens constituting said first fly-eye lens and passing through the vertex of each lens constituting said second fly-eye lens parallel to an optical axis.

5. A light irradiating apparatus according to claim 3 or 4, characterized in that said first lens having negative refractive power, said first fly-eye lens, said second lens having positive refractive power, said second fly-eye lens and said polarization converting element are disposed in succession from the light source side.

6. A light irradiating apparatus according to claim 5, characterized in that the pitch of lenses constituting said second fly-eye lens is greater than the pitch of lenses constituting said first fly-eye lens.

7. A light irradiating apparatus according to claim 5, characterized in that the pitch of the polarization separating portions of said polarization converting element is greater than the pitch of lenses constituting said first fly-eye lens.

8. A light irradiating apparatus according to claim 3 or 4, characterized in that said first lens having negative refractive power, said first fly-eye lens, said polarization converting element, said second lens having positive refractive power and said second fly-eye lens are disposed in succession from the light source side.

9. A light irradiating apparatus according to claim 8, characterized in that the pitch of lenses constituting said second fly-eye lens is greater than the pitch of lenses constituting said first fly-eye lens.

10. A light irradiating apparatus according to claim 3 or 4, characterized in that said first lens having negative refractive power, said first fly-eye lens, said second lens having positive refractive power, said polarization converting element and said second fly-eye lens are disposed in succession from the light source side.

11. A light irradiating apparatus according to claim 10, characterized in that the pitch of the polarization separating portions of said polarization converting element is greater than the pitch of lenses constituting said first fly-eye lens.

12. A light irradiating apparatus according to claim 3, characterized in that each of said plurality of polarization separating portions is comprised of a polarization separating prism.

13. An image projecting apparatus characterized by illuminating an image display element by the light emerging from a light irradiating apparatus according to claim 5, and projecting an image displayed on said image display element.

14. An image projecting apparatus characterized by illuminating an image display element by the light emerging from a light irradiating apparatus according to claim 8, and projecting an image displayed on said image display element.

15. An image projecting apparatus characterized by illuminating an image display element by the light emerging from a light irradiating apparatus according to claim 10, and projecting an image displayed on said image display element.

16. A light irradiating apparatus characterized in that a first fly-eye lens and a second fly-eye lens are disposed in succession from a light source side, a first lens having negative refractive power is disposed more adjacent to the light source side than said first fly-eye lens, and each lens constituting said second fly-eye lens is given positive refractive power which makes a ray of light emerging from each lens constituting said first fly-eye lens and passing through the vertex of said each lens parallel to an optical axis.

17. A light irradiating apparatus for emitting a light from a light source through a polarization converting element having a plurality of polarization separating portions, characterized in that a first fly-eye lens and a second fly-eye lens are disposed in succession from the light source side, a first lens having negative refractive power is disposed between the light source and said first fly-eye lens, and each lens constituting said second fly-eye lens is given positive refractive power which makes a ray of light emerging from each lens constituting said first fly-eye lens and passing through the vertex of said each lens parallel to an optical axis.

18. A light irradiating apparatus according to claim 17, characterized in that each of said plurality of polarization separating portions is comprised of a polarization separating prism.

19. A light irradiating apparatus according to claim 1, characterized in that said first lens and said first fly-eye lens are molded integrally with each other.

20. A light irradiating apparatus according to claim 1, characterized in that said second lens and said second fly-eye lens are molded integrally with each other.

21. A light irradiating apparatus according to claim 1, characterized in that the refractive index of the material of said first fly-eye lens and the refractive index of the material of said first lens differ from each other.

22. A light irradiating apparatus according to claim 21, characterized in that the refractive index of the material of said first lens is 1.7 or greater.

23. A light irradiating apparatus according to claim 1, characterized in that the focal length of each lens constituting said first fly-eye lens is shorter than the focal length of each lens constituting said second fly-eye lens.

24. A light irradiating apparatus according to claim 1, characterized in that said light source is a white light source.

25. A light irradiating apparatus according to claim 1, characterized by a reflecting member for condensing the light from the light source and causing it to enter said first lens.

26. A light irradiating apparatus according to claim 25, characterized in that said reflecting member is an elliptical mirror for reflecting the light from the light source and applying a convergent light beam to said first lens.

27. A light irradiating apparatus for applying light from a light source to an object to be irradiated through a polarizing element array comprising a plurality of polarizing elements arranged, characterized in that a divergent light is applied to a fly-eye lens, whereby a plurality of light source images of which the arrangement period is greater than the arrangement period of the lenses of said fly-eye lens are formed by said fly-eye lens, and light beams forming said plurality of light source images are directed to the polarizing element array of which the arrangement period of the polarizing elements is greater than the arrangement period of the lenses of said fly-eye lens.

28. A light irradiating apparatus for applying light from a light source to an object to be irradiated through a polarizing element array comprising a plurality of polarizing elements arranged, characterized in that a divergent light is applied to a first fly-eye lens, whereby a plurality of light source images of which the arrangement period is greater than the arrangement period of the lenses of said first fly-eye lens are formed by said first fly-eye lens, and light beams forming said plurality of light source images are directed to the polarizing element array of which the arrangement period of the polarizing elements is greater than the arrangement period of the lenses of said first fly-eye lens through a second fly-eye lens of which the arrangement period of the lenses is greater than the arrangement period of the lenses of said first fly-eye lens.

29. A light irradiating apparatus for applying light from a light source to an object to be irradiated through a polarizing element array comprising a plurality of polarizing elements arranged, characterized in that a divergent light is applied to a first fly-eye lens, whereby a plurality of light source images of which the arrangement period is greater than the arrangement period of the lenses of said first fly-eye lens are formed by said first fly-eye lens, and light beams forming said plurality of light source images are collimated, and thereafter are directed to the polarizing element array of which the arrangement period of the polarizing elements is greater than the arrangement period of the lenses of said first fly-eye lens.

30. A light irradiating apparatus according to claim 29, characterized by a second fly-eye lens for receiving the light from said polarizing element array, the arrangement period of the lenses of said second fly-eye lens being greater than the arrangement period of the lenses of said first fly-eye lens.

31. A light irradiating apparatus for applying light from a light source to an object to be irradiated through a polarizing element array comprising a plurality of polarizing elements arranged, characterized in that a divergent light is applied to a first fly-eye lens, whereby a plurality of light source images of which the arrangement period is greater than the arrangement period of the lenses of said first fly-eye lens are formed by said first fly-eye lens, and after or before light beams forming said plurality of light source images are collimated, the light beams are directed to the polarizing element array of which the arrangement period of the polarizing elements is greater than the arrangement period of the lenses of said first fly-eye lens through a second fly-eye lens of which the arrangement period of the lenses is greater than the arrangement period of the lenses of said first fly-eye lens.

32. A light irradiating apparatus according to any one of claims 27 to 31, characterized in that each of said polarizing elements is provided with at least one of polarization separating film and a half wavelength plate.

33. An image projecting apparatus characterized by illuminating an image display element by the light emerging from a light irradiating apparatus according to claim 32, and projecting an image displayed on said image display element.

34. An image projecting apparatus characterized by illuminating an image display element by the light emerging from a light irradiating apparatus according to any one of claims 1–4, 6–7, 9 or 11–12 and 16–31, and projecting an image displayed on said image display element.

35. An image projecting apparatus according to claim 34, characterized in that said image display element is a liquid crystal image display element.

* * * * *

UNITED STATES PATENT AND TRADEMARK OFFICE
CERTIFICATE OF CORRECTION

PATENT NO. : 6,246,526 B1  Page 1 of 1
DATED : June 12, 2001
INVENTOR(S) : Okuyama It is certified that error appears in the above-identified patent and that said Letters Patent is hereby corrected as shown below:

<u>Title page,</u>
Item [75] Inventor, delete "Tokorozawa" and insert therefor -- Kanagawa --

<u>Column 5,</u>
Line 32, delete "Rreference" and insert therefor -- Reference --

<u>Column 6,</u>
Line 59, delete "superinposed" and insert therefor -- superimposed --

Signed and Sealed this

Fifth Day of March, 2002

Attest:

JAMES E. ROGAN
*Attesting Officer*    *Director of the United States Patent and Trademark Office*